United States Patent
Armiroli et al.

(10) Patent No.: US 6,369,486 B1
(45) Date of Patent: Apr. 9, 2002

(54) MOTOR VEHICLE ALTERNATOR ROTOR WITH INTERPOSED PERMANENT MAGNETS

(75) Inventors: Paul Armiroli, Marolles en Brie; Jean-Philippe Badey, Etáples-sur-Mer, both of (FR)

(73) Assignee: Valeo Equipment Electriques Moteur, Creteil (FR)

( * ) Notice: Subject to any disclaimer, the term of this patent is extended or adjusted under 35 U.S.C. 154(b) by 0 days.

(21) Appl. No.: 09/601,199
(22) PCT Filed: Nov. 30, 1999
(86) PCT No.: PCT/FR99/02959
  § 371 Date: Jul. 28, 2000
  § 102(e) Date: Jul. 28, 2000
(87) PCT Pub. No.: WO00/33439
  PCT Pub. Date: Jun. 8, 2000

(30) Foreign Application Priority Data
Nov. 30, 1998 (FR) .............................................. 98 15033

(51) Int. Cl.⁷ ................................................. H02K 1/22
(52) U.S. Cl. ......................................... 310/263; 310/42
(58) Field of Search ................................. 310/261–263, 310/42, 91; 29/596–598

(56) References Cited

U.S. PATENT DOCUMENTS

| | | | |
|---|---|---|---|
| 4,617,485 A | * 10/1986 | Nakamura et al. | ............. 310/65 |
| 5,132,581 A | 7/1992 | Kusase | ........................ 310/263 |
| 5,483,116 A | * 1/1996 | Kusase et al. | ............... 310/263 |
| 5,780,953 A | * 7/1998 | Umeda et al. | ............... 310/263 |
| 5,793,143 A | 8/1998 | Harris et al. | ................. 310/263 |
| 5,969,459 A | 10/1999 | Taniguchi et al. | ........... 310/263 |
| 6,013,968 A | * 1/2000 | Lechner et al. | .............. 310/263 |
| 6,037,695 A | * 3/2000 | Kanazawa et al. | .......... 310/263 |
| 6,057,627 A | * 5/2000 | Ragaly | ........................ 310/263 |
| 6,150,746 A | * 11/2000 | Lechner | ....................... 310/181 |
| 6,157,111 A | * 12/2000 | Asao | ............................ 310/263 |
| 6,225,727 B1 | * 5/2001 | Oohashi et al. | .............. 310/263 |

FOREIGN PATENT DOCUMENTS

| | | |
|---|---|---|
| DE | 196 32 219 | 2/1998 |
| DE | 198 02 786 | 7/1999 |
| DE | 198 02 785 | 8/1999 |
| DE | 198 06 667 | 8/1999 |

OTHER PUBLICATIONS

Patent Abstracts of Japan, vol. 018, No. 332, Jun. 23, 1992 & JP 06 078479; Mar. 18, 1994.
French Search Report dated Aug. 12, 1999.
International Search Report dated Apr. 10, 2000.

* cited by examiner

Primary Examiner—Tran Nguyen
(74) Attorney, Agent, or Firm—Morgan & Finnegan, LLP

(57) ABSTRACT

The invention concerns a vehicle alternator comprising a rotor including a shaft, two plates comprising nested pole horns, magnets extending between the pole horns, and members for maintaining the magnets. The maintaining members extend opposite an external surface of the axial end of the plates.

15 Claims, 5 Drawing Sheets

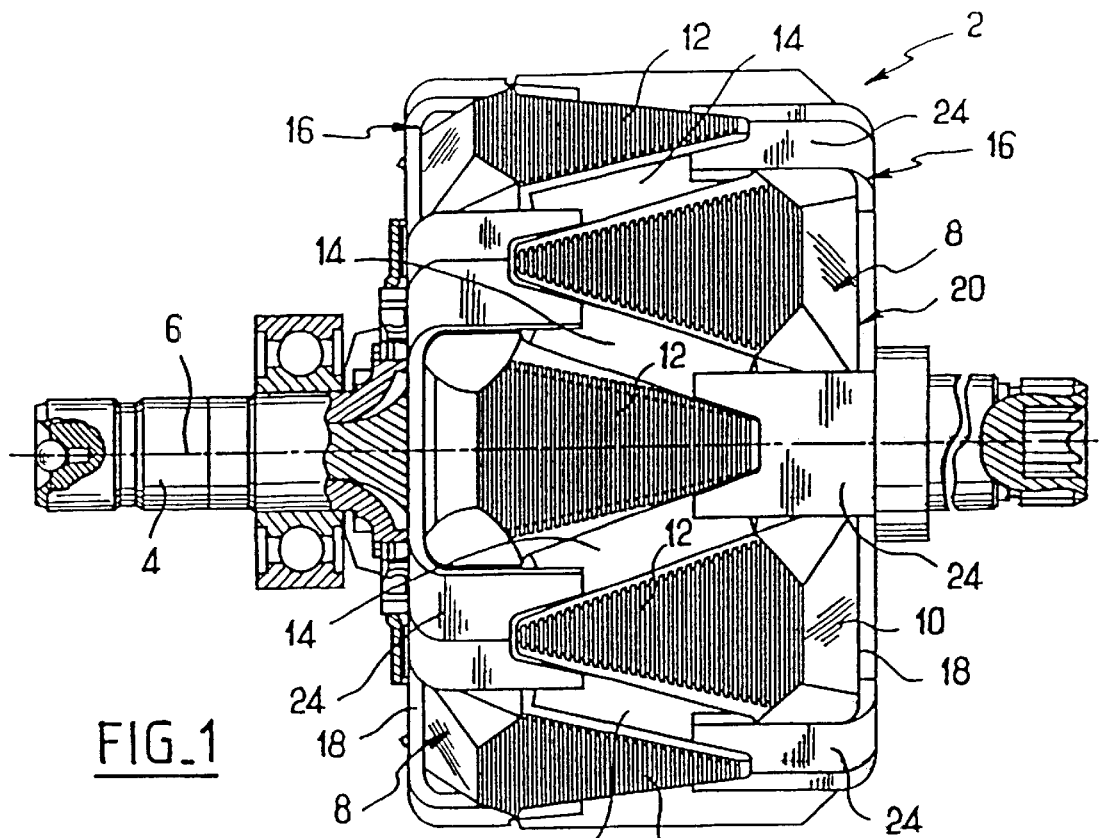
FIG_1
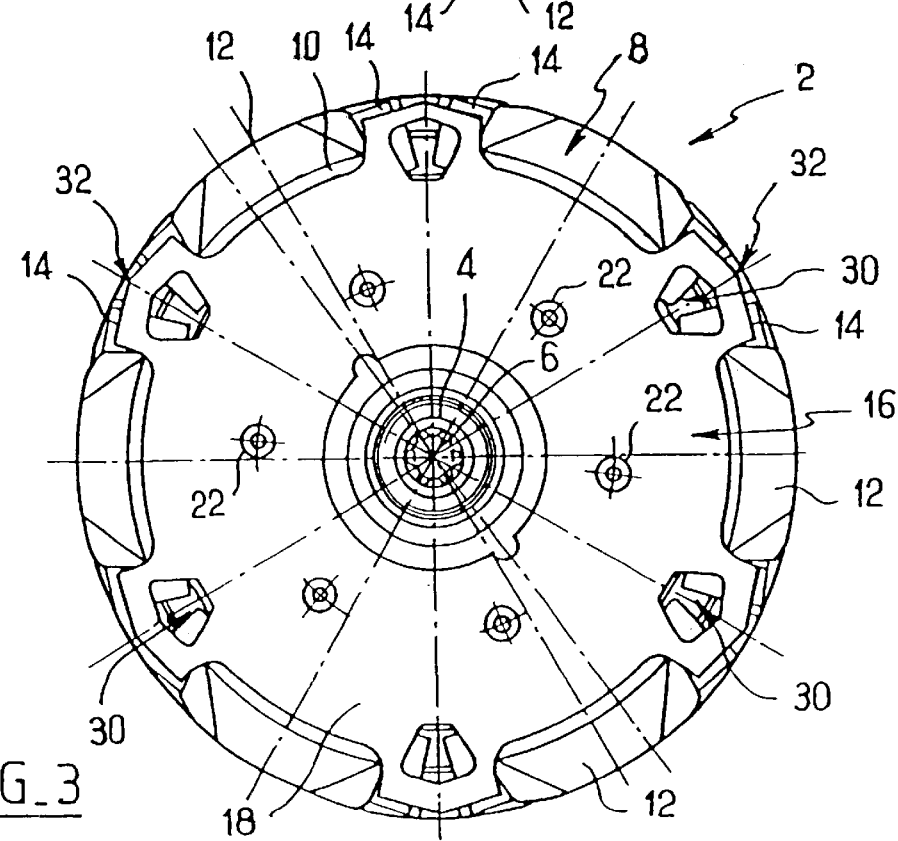
FIG_3

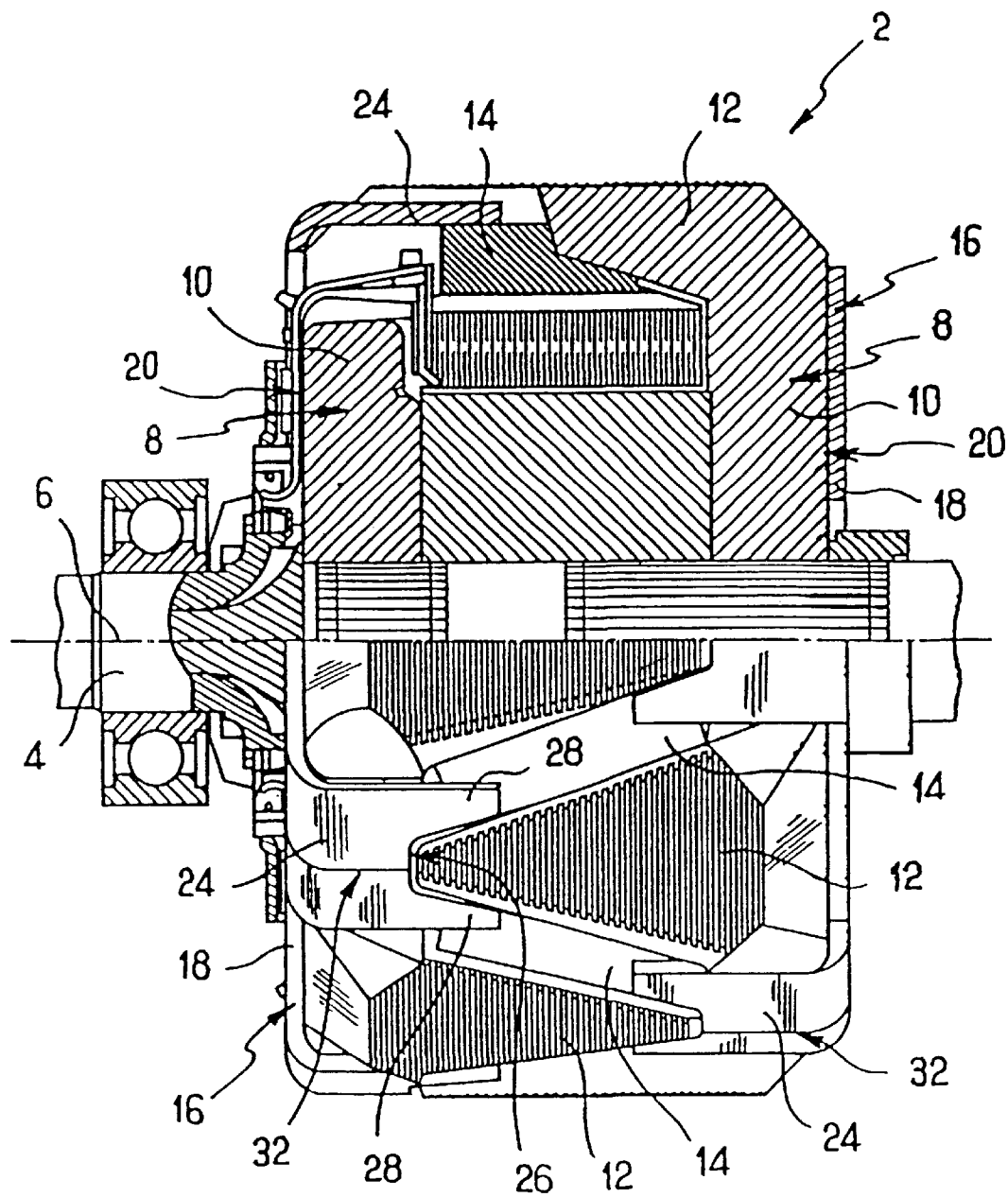
FIG_2

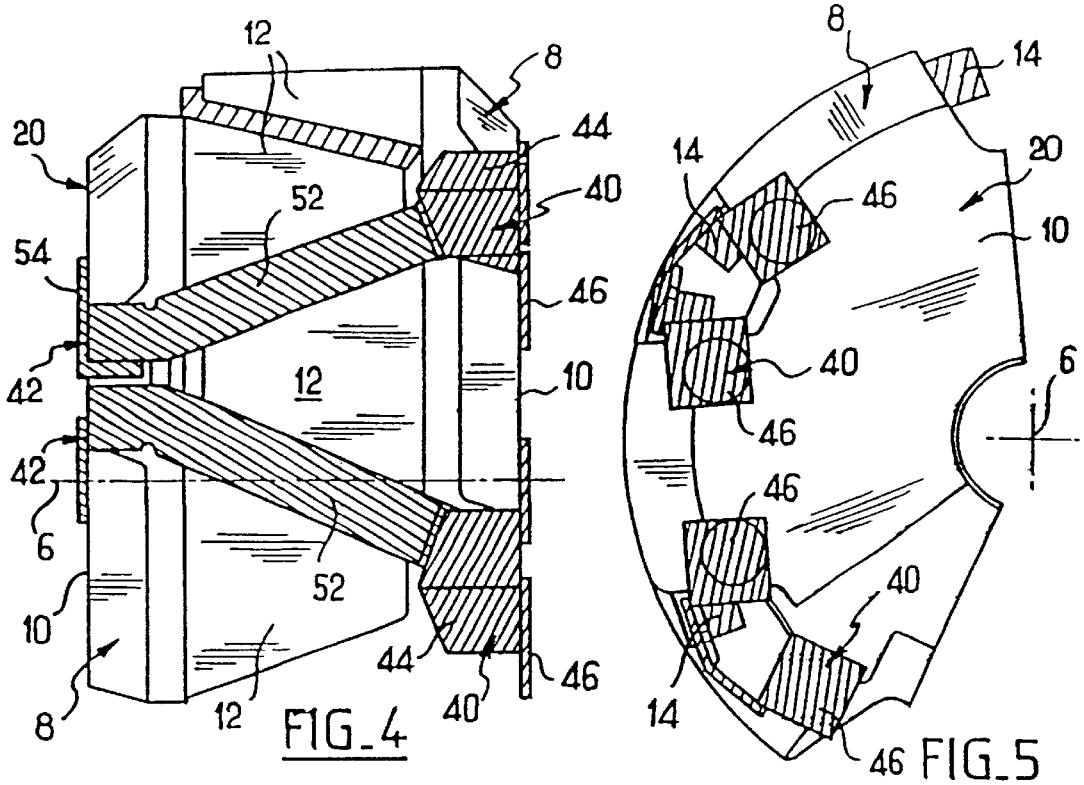
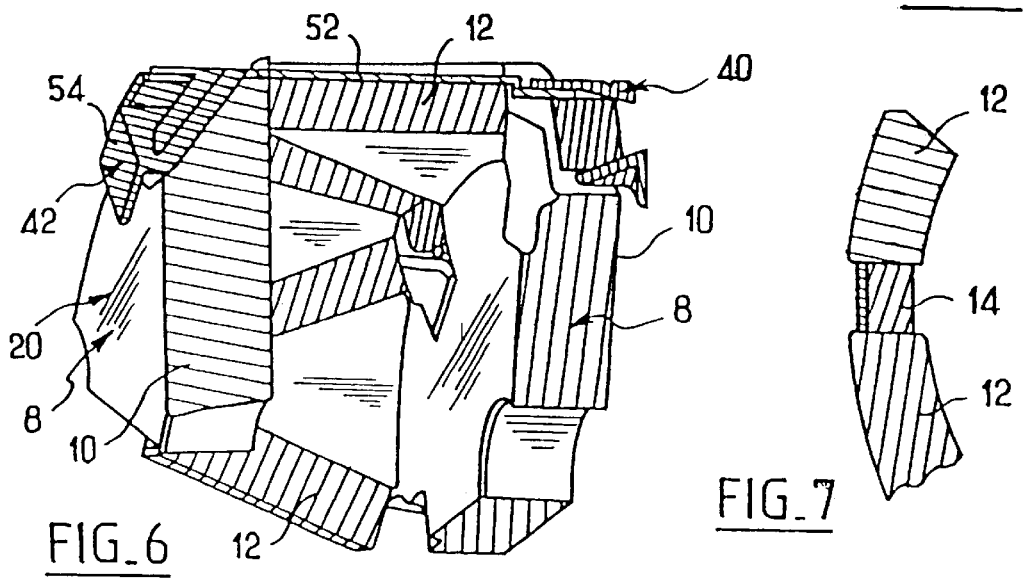
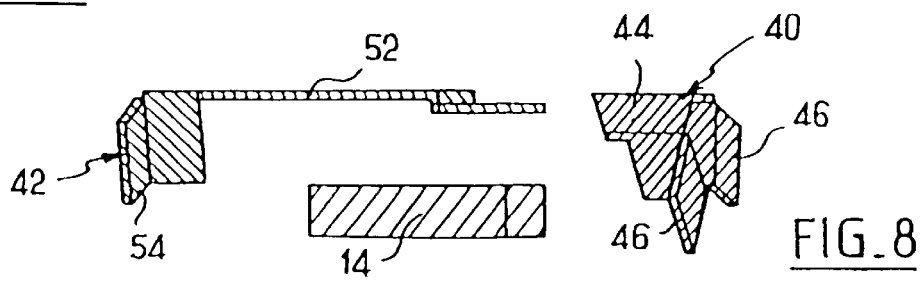

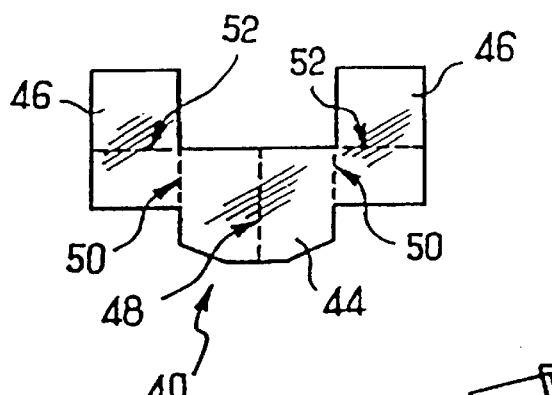
FIG_9
FIG_10
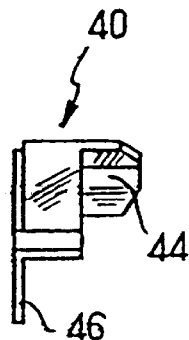
FIG_12
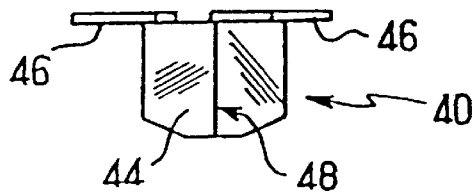
FIG_11
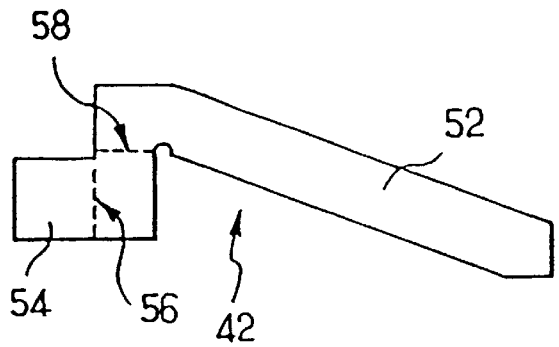
FIG_13
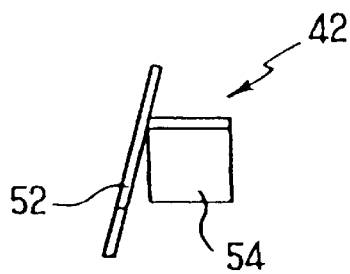
FIG_14
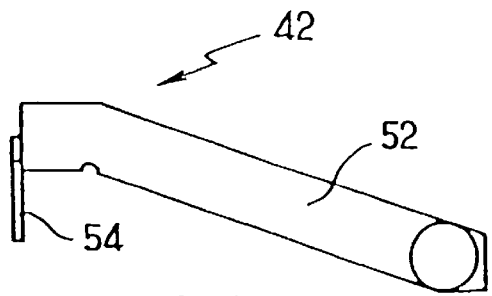
FIG_15

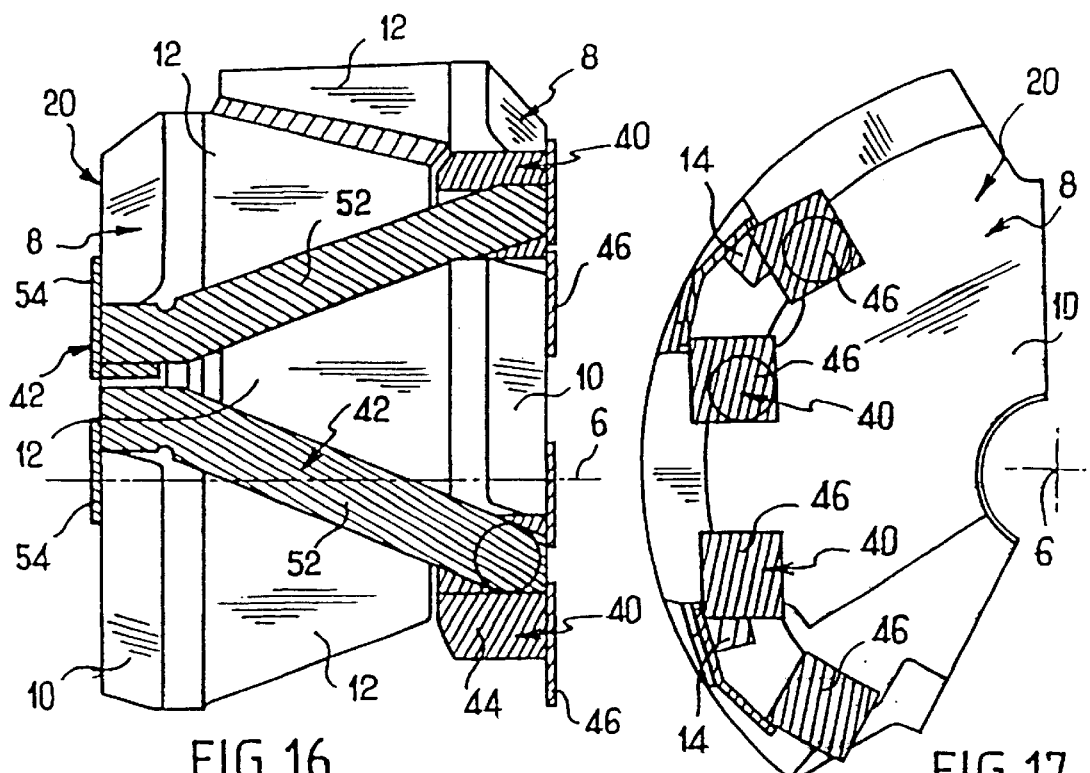
FIG_16  FIG_17
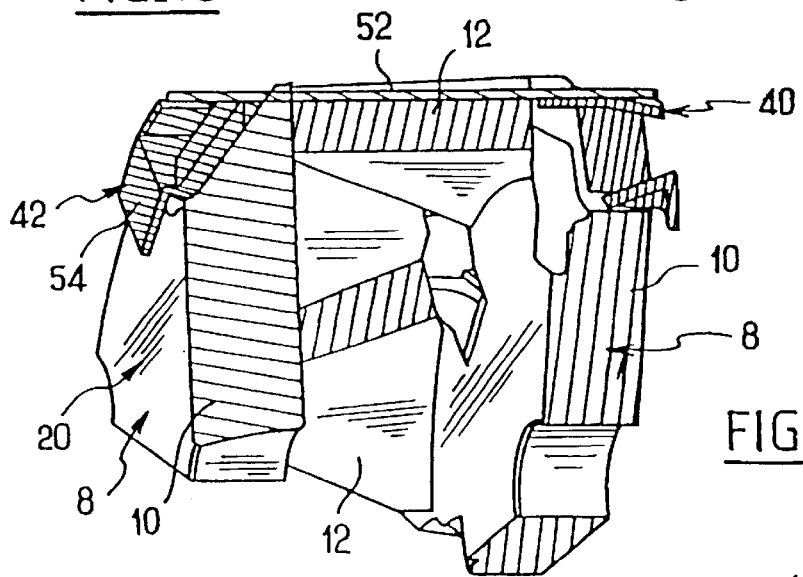
FIG_18
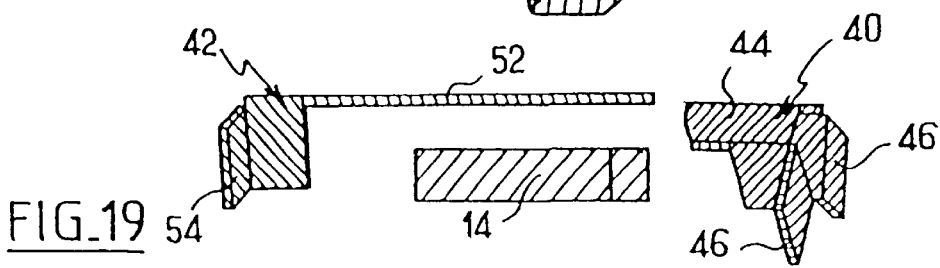
FIG_19

MOTOR VEHICLE ALTERNATOR ROTOR WITH INTERPOSED PERMANENT MAGNETS

BACKGROUND OF THE INVENTION

The present invention relates generally to rotating machines such as automobile of the type including a stator and a rotor.

A vehicle alternator rotor comprising a shaft and two plates threaded onto the shaft and comprising interleaved pole horns and permanent magnets disposed in the spaces between the pole horns is known in the art. The magnets are held in place by a one-piece resin holding member that receives the magnets in housings and is disposed between the plates and between the pole horns, for example. This device has the drawback that it requires the various components of the rotor to be assembled in a particular order, namely the order such that the magnets are housed on the holding member and the plates are attached to respective opposite sides of the holding member. This order of assembly can be a constraint in relation to the organization of the assembly line. What is more, a large portion of the holding member is inside the rotor and between the magnets and the pole horns. It follows that the volume of the magnets and/or other parts of the rotor must be reduced, which reduces the performance of the alternator.

BRIEF SUMMARY OF THE INVENTION

One aim of the invention is to provide a rotor of a different type, in particular one enabling a different order of assembly and preserving the internal volume of the rotor available for the magnets in particular.

With a view to achieving this object, the invention provides a vehicle alternator comprising a rotor including a shaft, two plates comprising interleaved pole horns, magnets lying between the pole horns, and magnet holding members, wherein the holding members face an outside axial end face of the plates.

The holding members are therefore adapted to be attached to the rotor in an axial direction of the rotor after the plates have been mounted. What is more, the portion of each holding member facing the outside axial end face of the plate does not extend into the interior of the rotor and the volume of the other parts of the rotor is therefore preserved commensurately.

The holding members advantageously face an outside circumferential face of the magnets.

The external support therefore preserves mere of the internal volume of the rotor than holding the magnets internally.

The holding members advantageously comprise lugs each adapted to face an outside circumferential face of two magnets.

Each lug advantageously comprises two plane parts separated by a bend parallel to an axis of the rotor.

The lug therefore takes account of the different inclinations of the two magnets about the axis of the rotor without complicating the fabrication of the lug.

Each lug advantageously has a notch at one end edge.

The notch houses the point of the pole horn facing the lug and the lug can therefore be made longer on both sides of the pole horn.

The holding members advantageously each include a flange facing one of the plates.

Each holding member advantageously has openings communicating with spaces under the magnets.

This allows air to pass under the magnets to cool the interior of the rotor.

The holding member are advantageously fixed directly to the plates.

The holding members are advantageously fixed to an outside axial end face of the plates.

The holding members are advantageously welded to the plates.

Each holding member advantageously extends continuously from one outside axial end face of the respective plates to the other.

The holding members advantageously comprise first members fixed to a first of the plates and extending along the magnets and second members fixed to the second plate and to the first members.

The second members advantageously cover,the first members in a radial direction relative to an axis of the rotor.

The first members advantageously cover the second members in a radial direction relative to an axis of the rotor.

The first and second members are advantageously each in one piece.

The holding members are advantageously made of bent plate.

BRIEF DESCRIPTION OF THE DRAWINGS

Other features and advantages of the invention will become more apparent in the course of the following description of two preferred embodiments and one variant specified by way of non-limiting example. In the accompanying drawings:

FIG. 1 is an elevation view of a rotor of a first embodiment of an alternator according to the invention;

FIG. 2 is a view partly in elevation and partly in axial section of the rotor shown in FIG. 1;

FIG. 3 is an axial end view of the rotor shown in FIG. 1;

FIGS. 4, 5 and 6 are respectively partial elevation, axial and perspective cutaway views of a rotor of a second embodiment of an alternator;

FIG. 7 is a local cross-sectional view of the rotor shown in FIG. 4;

FIG. 8 is an exploded view of a magnet and two holding members of the rotor shown in FIG. 4;

FIG. 9 is a view of one of the holding members shown in FIG. 8 before it is bent;

FIGS. 10, 11 and 12 are front, top and left-hand side views of the holding member shown in 9 after it is bent;

FIG. 13 is a view of the other holding member shown in FIG. 8 before it is bent;

FIGS. 14 and is are front and left-hand side views of the holding member shown in FIG. 13 after it is bent; and FIGS. 16, 17, 18 and 19 are views analogous to FIGS. 4, 5, 6 and 8 showing a variant of the second embodiment.

DETAILED DESCRIPTION OF THE INVENTION

Referring to FIGS. 1, 2 and 3, the rotor 2 of the automobile vehicle alternator includes a shaft 4 which has an axis 6 and two pole plates 8 each of which comprises a disc-shaped wall 10 with an axis 6 and pole horns or claws 12. Each pole horn 12 has a generally flat triangular shape. The pole horns 12 of each plate 8 lie with their tip towards the other plate, interleaved with the pole horns of the other plate and leaving gaps between adjacent pole horns. The rotor includes permanent magnets 14 of generally parallelepipedal shape housed in the gaps between and glued to the adjacent pole horns 12.

In a first embodiment, which is shown in FIGS. 1 to 3, the rotor 2 includes two holding members 16 each of which comprises a disc-shaped flange 18 lying parallel to and coaxial with the plates 8 against an outside axial end face 20 of the wall 10. FIG. 3 shows that the flange 18 is welded, screwed or clipped to the wall 10 of the plate at several points 22.

Each holding member 16 has lugs 24 integral with the flange 18. The lugs 24 each have a generally rectangular shape parallel to the axis 6 and to the circumferential outside wall of the pole horns 12 and the magnets 14. The lugs 24 on each holding member 16 extend from the flange 18 towards the other holding member. What is more, they extend towards the tip of the pole horn 12 associated with the plate 8 to which the other holding member is fixed. To this end, each lug 24 has a rectilinear free end edge orthogonal to the axis 6 in which there is a generally U-shape notch 26 which has diverging branches and is adapted to receive the tip of the pole horn 12 towards which the lug 24 is directed. The notch 26 defines two tongues 28 on the lug which lie one on each side-of -the pole horn 12 facing and in contact with the circumferential outside face of the two magnets 14 lying against the aforementioned pole horn. ., Each magnet 14 is held radially by a tongue 28 of a lug 24 at one axial end and by a tongue 28 of another lug at the other axial end. Each lug 24 has a longitudinal bend 32 parallel to the axis 6 which divides the lug into two plane parts which are symmetrical to each other with respect to the bend and slightly inclined to each other to follow the corresponding inclination of the circumferential outside faces of the magnets 14 against which the lug bears.

To assemble the rotor, the two plates 8 are mounted on the shaft 4, one of the holding members 16 is fitted axially against one of the plates 8, the magnets 14 are slid between the pole horns 12 from the location of the holding member 16 remaining to be installed, and then that holding member is fitted axially to the assembly.

Each flange 18 has louvers forming axial openings 30 at the root of each lug 24. The louvers allow air to pass from one of the flanges to the other inside the rotor, under the magnets 14.

The interpolar permanent magnets 14 can be ferrite or rare earth magnets. The two holding members 16 can have different shapes and/or dimensions, depending on the application. The permanent magnets 14 could bear in the radially inward direction on a shoulder on the plates 8.

FIGS. 4 to 15 show a second embodiment of an alternator according to the invention, in which parts which are no different retain the same reference numbers. The rotor comprises holding members constituting two series of holding members. The first holding members 42 are shown in FIGS. 13 to 15. They are identical to each other before they are bent and after they are bent they are of two different types which are mirror images of each other. The second holding members 40 are identical to each other and are shown in FIGS. 9 to 12. Each holding member 40, 42 is cut and bent to shape from a single piece of plate.

Referring to FIGS. 9 to 12, after cutting and before bending, each second holding member 40 is generally Y-shaped and wider than it is high, having a base 44 at the bottom and two branches 46 at the top. When it is bent, rectilinear bends are formed in the following manner: a bend 48 extends in the heightwise direction of the Y-shape along the median line of the base 44 to produce two parts slightly inclined to each other so that the base 44 is roof-shaped. Two other bends 50 parallel to the bend 48 extend to the limit of each branch 46 with the foot to bend the branches by more than 90°. Two other bends 52 perpendicular to the preceding two bends extend halfway along the height of the branches 46 to divide them into two substantially equal parts.

Referring to FIGS. 13 to 15, after cutting and before bending, each first holding member 42 is generally S-shaped, as shown in FIG. 13, one end 52 of the S-shape being highly elongate, rectilinear and inclined so that it is aligned with the other end 54. A rectilinear bend 56 extends to the root of the second end 54. Another bend 58, perpendicular to the preceding bend, lies in the intermediate part of the S-shape. The first bend 56 produces an inclination of 90° and the second bend 58 produces a slightly greater inclination.

To assemble the rotor, the first holding members 42 are disposed so that the long branch 52 of the S-shape covers all of the interpolar space and all of the circumferential outside face of the interpolar magnets 14 subsequently disposed between the pole horns. The short branch 54 is parallel to, in surface contact with and welded to the outside axial end face 20 of one of the plates 8. The spot welds are represented by circles in the drawings. All the first members 42 are welded to the same plate 8 in this way, namely the left-hand plate in FIG. 4. The inclination of the long branch 54 of the S-shape corresponds to the inclination of the space between the pole horns to the axis 6 of the rotor. However, this inclination changes alternately from one of the successive interpolar spaces to the next, so that two types of first members 42 must be used, with respective inclinations. To this end, all the first members 42 are cut in the same way, as shown in FIG. 13, but some are bent with the bends 56, 58 to one side and the remainder with them to the other side. Thus FIGS. 14 and 15 show one of these two types of first member. There are as many first members 42 as there are spaces between the pole horns 12.

The magnets 14 are then introduced into the spaces between the pole horns 12 from the second plate 8 and glued to the first holding members 42.

The second holding members 40 are then disposed so that the two-part base 44 covers the respective ends of the long branches 52 of the first two holding members 42 and are in surface contact with them. To this end, the long branches 52 have at their ends a step imparting giving them an S-shaped profile. The end part of this step is therefore covered by the second holding member 40 in the radial direction relative to the axis 6 and fixed to the latter by welding. The ends of the branches 46 extend over the outside axial end face 20 of the other plate 8 and are in surface contact with and welded to it. There are half as many second holding members 40 as there are first holding members 42.

In the variant of the second embodiment shown in FIGS. 16 to 19 the long branches 52 do not have the step and cover the base 44 of the second holding members 40 in a radial direction relative to the axis 6 and are in surface contact with and welded to it.

In the second embodiment and its variant, each holding member consists of first and second members 40, 42 and extends continuously from one of the outside axial end faces 20 of the plates 8 to the other.

What is claimed is:

1. A vehicle alternator comprising a rotor including a shaft, two plates comprising interleaved pole horns, magnets lying between the pole horns, and magnet holding members, wherein the holding members face an outside axial end face of the plates, and wherein the holding members are made of bent plate.

2. An alternator according to claim 1, wherein the holding members face an outside circumferential face of the magnets.

3. An alternator according to claim 2, wherein the holding members comprise lugs facing an outside circumferential face of two magnets.

4. An alternator according to claim 3, wherein each lug comprises two plane parts separated by a bend parallel to an axis of the rotor.

5. An alternator according to claim 3 wherein each lug has a notch at one end edge.

6. An alternator according to claim 1, wherein the holding members each include a flange facing one of the plates.

7. An alternator according to claim 1, wherein each holding member has openings communicating with spaces under the magnets.

8. An alternator according to claim 1, wherein the holding member are fixed directly to the plates.

9. An alternator according to claim 1, wherein the holding members are fixed to an outside axial end face of the plates.

10. An alternator according to claim 1, wherein the holding members are welded to the plates.

11. An alternator according to claim 1, wherein each holding member extends continuously from one outside axial end face of the respective plates to the other.

12. An alternator according to claim 1, wherein the holding member comprise first members fixed to a first of the plates and extending along the magnets and second members fixed to the second plate and to the first members.

13. An alternator according to claim 12, wherein the second members cover the first members in a radial direction relative to an axis of the rotor.

14. An alternator according to claim 12, wherein the first members cover the second members in a radial direction relative to an axis of the rotor.

15. An alternator according to claim 12, wherein the first and second members are each in one piece.

* * * * *